Oct. 1, 1940.  J. J. FLANAGAN  2,216,704
COMBINED CARGO LOADING AND TRIMMING DEVICE
Filed April 15, 1939  6 Sheets-Sheet 1

INVENTOR
JAMES J. FLANAGAN
BY
Axton and Griswold
ATTORNEYS

Oct. 1, 1940.   J. J. FLANAGAN   2,216,704
COMBINED CARGO LOADING AND TRIMMING DEVICE
Filed April 15, 1939   6 Sheets-Sheet 2

INVENTOR
JAMES J. FLANAGAN
BY
Orton and Griswold
ATTORNEYS

Oct. 1, 1940.  J. J. FLANAGAN  2,216,704
COMBINED CARGO LOADING AND TRIMMING DEVICE
Filed April 15, 1939   6 Sheets-Sheet 4

INVENTOR
JAMES J. FLANAGAN
BY
Orton and Griswold
ATTORNEYS

Oct. 1, 1940.   J. J. FLANAGAN   2,216,704
COMBINED CARGO LOADING AND TRIMMING DEVICE
Filed April 15, 1939   6 Sheets-Sheet 5

INVENTOR
JAMES J. FLANAGAN
BY
Orton and Griswold
ATTORNEYS

Patented Oct. 1, 1940

2,216,704

UNITED STATES PATENT OFFICE 2,216,704

COMBINED CARGO LOADING AND TRIMMING DEVICE

James J. Flanagan, Port Arthur, Tex.

Application April 15, 1939, Serial No. 268,013

14 Claims. (Cl. 214—15)

This invention relates to a cargo loading and trimming device of the kind adapted for vessels carrying cargo in bulk, but not so limited.

As the usual thing, a cargo such as grain, coal or the like, is poured through the hatch into the hold of a vessel where it forms a mound and flows towards the sides of the ship until the angle of repose of the particular material is reached. Thereafter, gangs of men are sent into the hold to shovel or push the cargo to the sides whereby the ship is trimmed. Mechanical trimming devices have heretofore been provided which push material toward the sides of the ship after the material has been introduced into the hold, but no device has heretofore been provided which combines the function of introducing the material into the hold of the ship and at the same time trims the material so that it is evenly distributed throughout the hold to maintain the center of gravity of the vessel at the proper point.

One object of the present invention is a loading and trimming device which may receive from a point above the deck, material such as grain or coal from an outside delivery device, such as a grain elevator or coal chute, and deliver it to any selected part of the hold.

Another object of the invention is a cargo loading and trimming device which may be mounted to travel upon the hatch coaming and is capable of movements of translation in directions at right angles to one another so that various parts of the hold may be reached.

Yet another object of the invention is the provision of a loading and trimming device which is capable not only of movements at right angles to one another but is also capable of rotative movements so that every part of the hold may be reached.

In many situations, it is found desirable to load some of the cargo, such as grain, in sacks which are piled up in regular order on top of the bulk material, as a further means of preventing the cargo from shifting. The present invention contemplates means adapted, if desired, to be associated with the loading and trimming device of this invention whereby sacks may be filled.

A further object of the invention is a cargo loading and trimming device which is adjustable to the size of a particular hatch coaming.

It is still another object of the invention to provide a loading and trimming device which may be readily delivered to and mounted upon the hatch coaming on any deck of a multi-deck vessel in a simple manner as by a crane.

The invention further seeks to provide a loading and trimming device which is practical from the standpoint of ease and convenience of manipulation and use.

These and other objects of the invention and the means for their attainment will be more apparent from the following detailed description, taken in connection with the accompanying drawings illustrating various embodiments by which the invention may be realized, and in which:

Figures 1, 2, 3:
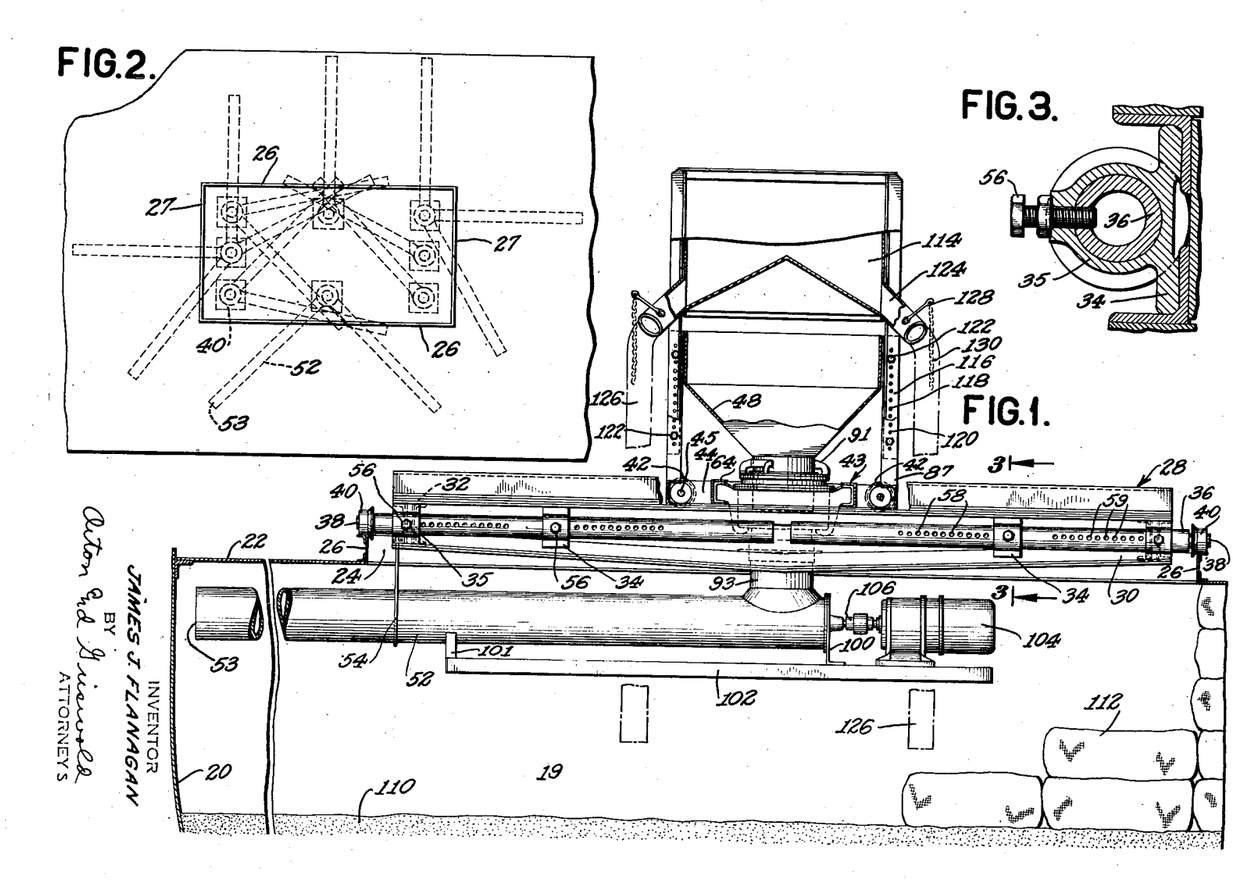
Figure 1 is a view partly in section, showing one modification of the loading and trimming device of this invention in side elevation and mounted on the hatch coaming of a cargo vessel.
Figure 2 is a diagrammatic view showing a section of a cargo vessel, in plan, to illustrate the various positions the loading and trimming device is capable of assuming whereby material may be delivered to all parts of a hold.
Figure 3 is a fragmentary sectional view, taken in the plane indicated by the line 3—3 of Figure 1, looking in the direction of the arrows and showing particularly the instrumentalities by which the gauge of the main carriage may be adjusted to a particular hatch coaming.

Referring first to Figure 1, the fragmentary portion of the hold 19 of a ship is shown in transverse section as defined by the side wall 20 and the deck 22 which may be either the upper deck of the vessel or may represent a 'tween deck. This deck is shown as provided, intermediate the sides of the vessel with a hatch 24 defined by a hatch coaming 26, 27. In this instance, the hatch is rectangular, as shown in plan in Figure 2, where the longitudinal sides 26 of the hatch coaming are connected at their ends by transverse coaming portions 27.

Figures 4, 5, 6:
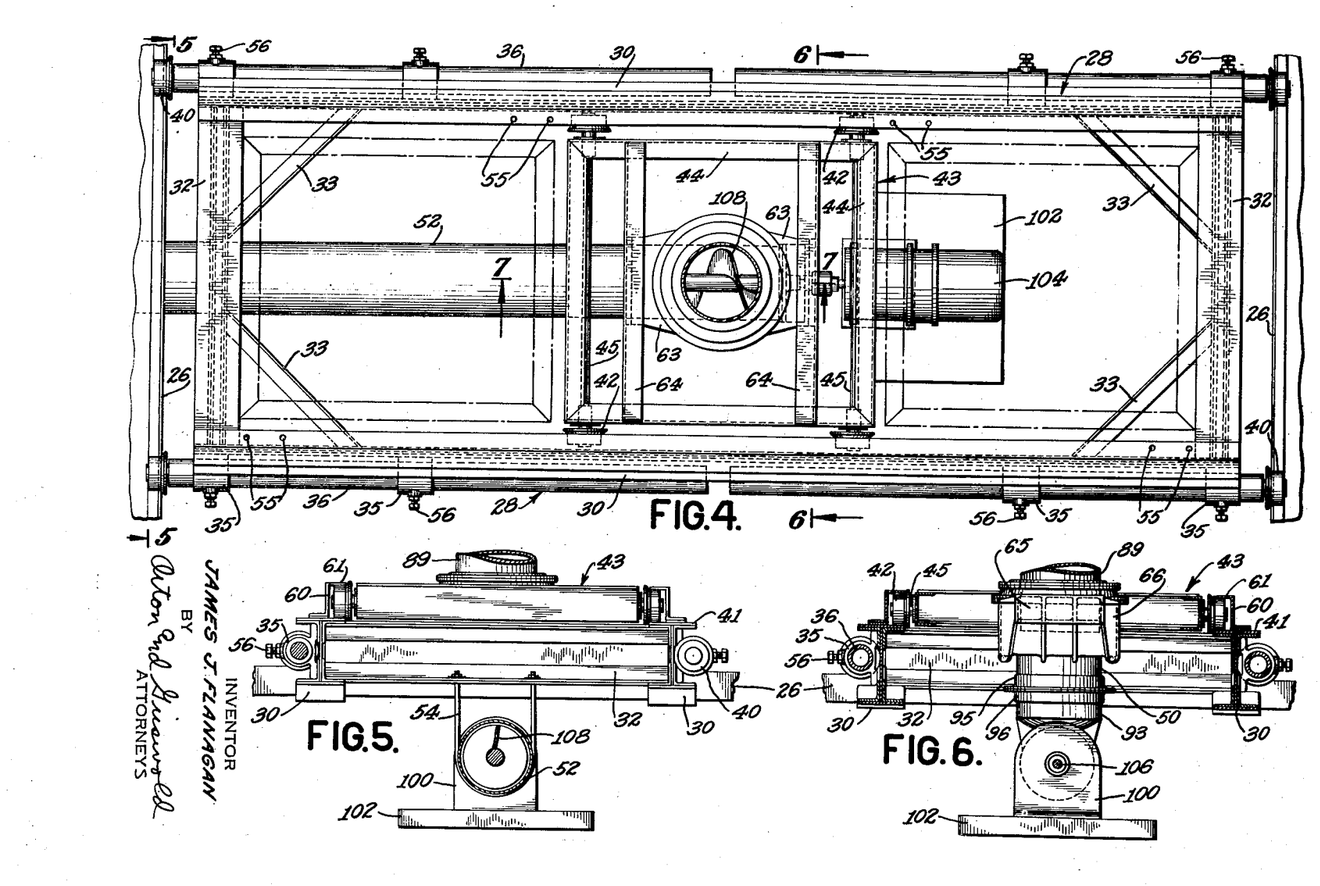
Figure 4 is a plan view of the loading and trimming device of Figure 2, looking from above in that figure, the hopper and hopper frame being removed in the interest of clearness.
Figure 5 is a view, in end elevation, showing the main and transverse carriages looking from the left of Figure 4 and taken on the line 5—5 of that figure.
Figure 6 is a transverse sectional view taken in the plane indicated by the line 6—6 of Figure 4 and looking in the direction of the arrows.

There is provided, in accordance with this invention, a carriage comprising a rectangular frame of greater length than breadth of generally fabricated longitudinal side beams 30 connected at their respective ends by transverse fabricated I beam end members 32, see Figure 4. Corner braces between the side and end members are shown at 33. For strength, the side frame members 30 preferably take the form of trusses, as shown in Figure 1.

Mounted on each side of the trusses and proximate each end are pairs of spaced brackets 34 fitted within the flanges of each truss and respectively having tubular portions 35 adapted to adjustably receive cylindrical or tubular axle carrying members 36 carrying at their outer ends the axles 38 on which are mounted flanged wheels or rollers 40 adapted to run on, say, the longitudinal portions 26 of the hatch coaming.

The plates 41 on the upper flanges of the longitudinal side frame members 30 of the main carriage, just described, serve as rails upon which the flanged rollers or wheels 42 of a rectangular traversing carriage 43 travel. The carriage is formed of fabricated channels 44 and has an axle 45 at each corner for the wheels 42 so that the traversing carriage 43 may travel from end to end of the main carriage and assume any position thereon.

It will thus be seen, referring to Figure 2, that the main carriage may move or occupy any point along the side members 26 say, of the hatch coaming while the traversing carriage 43 may occupy any position transversely of the main carriage such as either of the dot and dash outlined positions at either end of the main carriage 28, as shown in Figure 4 or the full line central position as shown in that figure or any intermediate position. Thus the traversing carriage 43 may occupy any position, within the area of the hatch, see Figure 2, which is necessary in delivering material into the hold. The traversing carriage is provided with a hopper 48 delivering material through a vertically disposed delivery tube 50 to a horizontal screw conveyor tube 52, all supported on the traversing carriage 43. The horizontal tube is adapted to rotate about the vertical axis of the vertical delivery tube 50. Thus the screw conveyor tube 52 is adapted to rotate in a horizontal plane about the vertical axis of the tube 50 and assume, among others, the various dotted line positions shown in Figure 2 so that material delivered to the hopper 48 and passing to the screw conveyor tube 52 may be expelled from the end 53 of the conveyor tube to fall at any selected point within the hold and thus insure that the cargo in that hold is trimmed. The varying positions of the screw conveyor tube 52, shown in dotted outline in Figure 2, illustrate clearly how the delivery mouth 53 of the tube 52 may be disposed at any conceivable point within the hold, all of course, in the same horizontal plane.

It will be appreciated that the loading and trimming device just described is removable from the hatch so that it can be used on any hatch on any ship. In applying the loader to or removing it from a hatch, it is slung from a crane and tipped as it is raised or lowered so that the screw conveyor tube 52 may be swung through the hatch. At such times the tube 52 is held in fixed position by a U-shaped locking member 54, and at any position the traversing carriage 43 may be secured against displacement by locking devices in any one of the sets of apertures 55, as by centering a wheel between the apertures of a pair and placing a pin in each aperture so that the wheel is prevented from movement.

In determining the proper gage of the wheels 40, the exact width, within limits, of the hatch is determined and then the tubes 36 are adjusted in the brackets 34, 35, and locked in adjusted position by means of bolts 56. Each tube is carried in at least two brackets. Each tube is shown as having two series of apertures 58 and 59, one series corresponding to each bracket 34 so that a bolt 56 may enter an aperture 58 or 59 and lock the tubes in position. If desired, the spacing of the apertures 58 of one series may differ from the spacing of the apertures of the other series 59, say, the distance of adjacent apertures of the series 58 may be twice that of the spacing of the other or these may be in overlapping relationship so that a relatively fine and exact adjustment of the position of the wheels may be obtained, as will be understood.

Referring now to Figures 5 and 6, retaining members 60 are mounted upon the top face of the trusses 30. These retaining members 60 are substantially Z-shape in cross-section, having a horizontal portion 61 adapted to overlie the wheels 42 of the traversing carriage 43. These retaining members 60 act not only as guides for the wheels or rollers 42 but also prevent tipping of the carriage 43, that is, they prevent lifting up of one side of the carriage 43 should there be an unbalanced pressure when this carriage is in use.

Figures 7, 8:
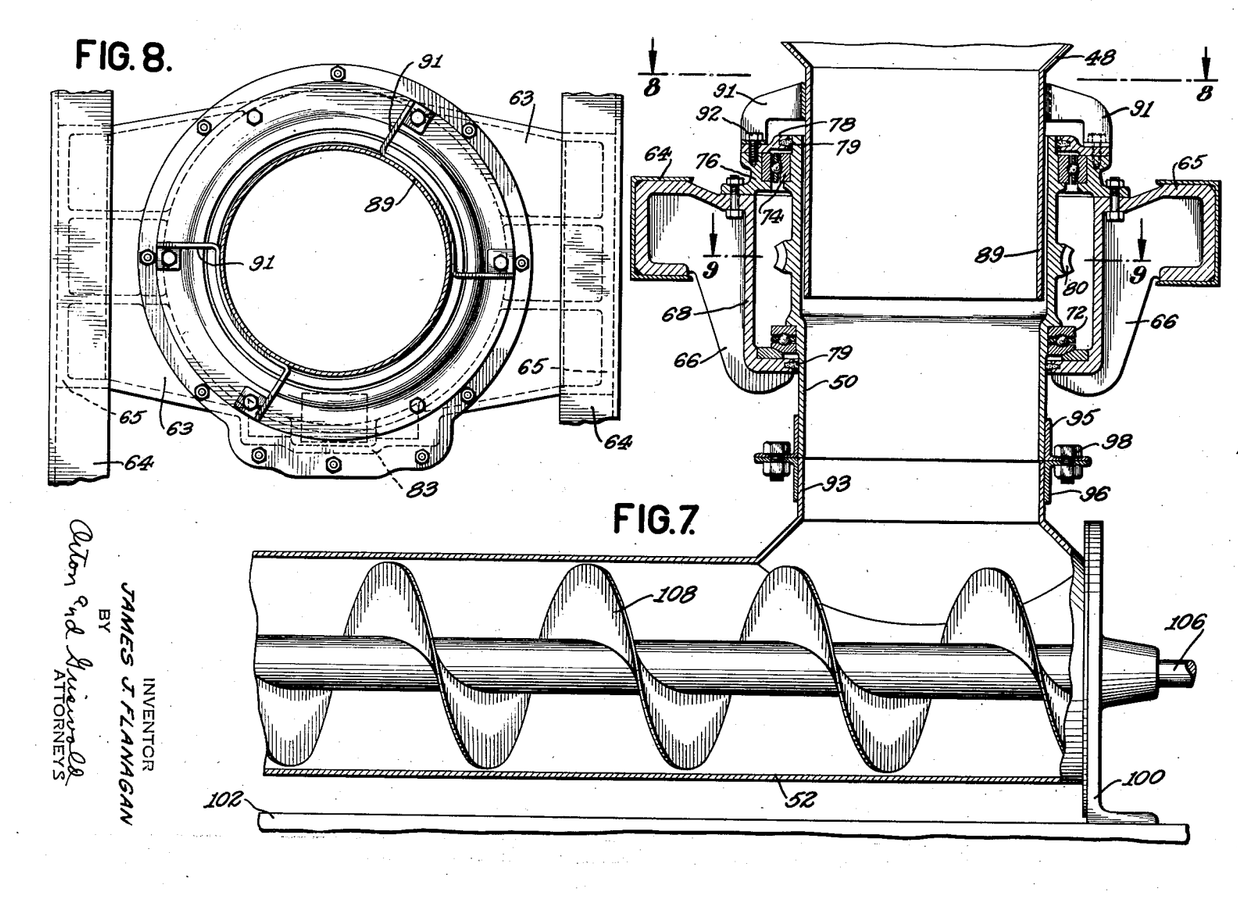
Figure 7 is a sectional view showing the delivery chute and the rotatable supporting means therefore.
Figure 8 is a view, in plan, taken in the plane indicated by the line 8—8 of Figure 7, looking in the direction of the arrows.
Figure 9:
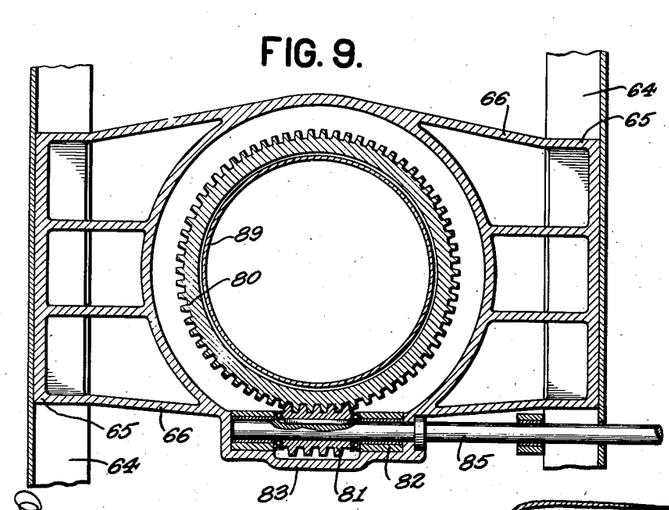
Figure 9 is a transverse sectional view taken in the plane indicated by the line 9—9 of Figure 7, looking in the direction of the arrows and showing, particularly, the bearing frame for the delivery chute.
Figure 10:
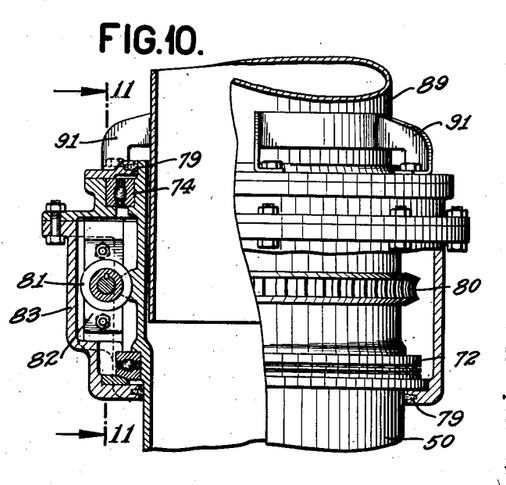
Figure 10 is a fragmentary view in elevation and partly in vertical section showing details of the bearing of Figure 9.
Figure 11:
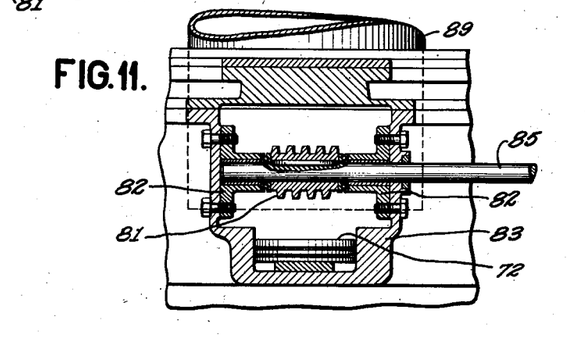
Figure 11 is a fragmentary view in vertical section, taken in the plane indicated by the line 11—11 of Figure 10.

Referring now to Figures 8, 9 and 10, a bearing frame 63 is shown as extending between opposed ship channels 64 of the carriage 43. This bearing frame consists essentially of flanged channel portions 65 carried within the ship channels 64, of the traversing carriage 43 and having bracket-like portions or ribs 66 which support an annular frame 68.

A vertical delivery tube 50 is rotatably mounted within the frame 68 being carried upon thrust bearings 72 and rotatably positioned at its upper part by suitable antifriction devices shown as ball bearings 74 between an annular separable extension 76 removably secured to the frame and a dust cover plate 78 provided, say, with felt 79 and adapted to make a dust-proof contact with the rotatable tube 50.

The rotatable delivery tube 50 may be formed with or otherwise carry a worm wheel 80 adapted to be meshed with a worm 81 suitably journalled as at 82 in an extension of or housing 83 on the bearing frame and adapted to be turned by, say, a shaft 85 which may be rotated by hand as with a crank, not shown, or from any other power means such as a motor, not shown.

Extending upwardly from the framing channels 44 of the traversing carriage 43 are vertically disposed uprights or corner posts 87 of a filling hopper supporting frame which supports the filling hopper 48. The neck 89 of the filling hopper 48 registers with and extends within the vertical tube 50 aforesaid. Clips 91 centralize the neck 89 of the hopper, being removably mounted upon the dust cover plate 78 as by bolts 92.

Suspended from the bottom of the vertical tube 50 is the vertical receiving tube 93 of the horizontal screw conveyor tube 50. Tube section 93 is removably secured to the vertical tube 50 by registering flange rings 95 and 96, respectively secured to the vertical tube 50 and to the cylindrical portion 93 leading to the conveyor tube 52 and bolted together as by the bolts 98.

Suitably mounted with respect to the screw conveyor tube 50 and in fact depending therefrom as by brackets 100, 101 is a platform 102 on which is mounted a motor 104 adapted to drive a shaft 106 axially of the conveyor tube 52 and which shaft 106 is the shaft of the screw conveyor 108 illustrated in Figure 7, the screw conveyor 108 being adapted to receive material delivered into the hopper 48 and flowing from the hopper 48 through the vertical tubes 50 and 93 into the screw conveyor tube 52 and conveyed out of the end 53 thereof by means of the screw conveyor 108 to fill the hold evenly as shown at 110.

Above the cargo in bulk as shown at 110 the material is frequently stowed in sacks 112 to prevent shifting. A supplemental detachable hopper 114 (Figure 1) is therefore provided which is removably and adjustably mounted on the hopper frame 87. As shown, the removable hopper 114 is supported upon corner legs 116 each of which is provided with a plurality of apertures 118 at least one of which is adapted to register with one of a series of apertures 120 formed in the corner posts 87. The legs and the corner posts are secured together by bolts 122. The removable hopper 114 is provided with a plurality of spouts 124 of any desired length which may, if desired, have extensions 126 to extend through the hatch within the hold whereby the sacks 112 may be filled. Gates may control the spouts being in turn operated by the gate actuating lever arms 128 actuated by chains 130 which may extend into the hold for operation by the bag filling gang.

Figure 12:
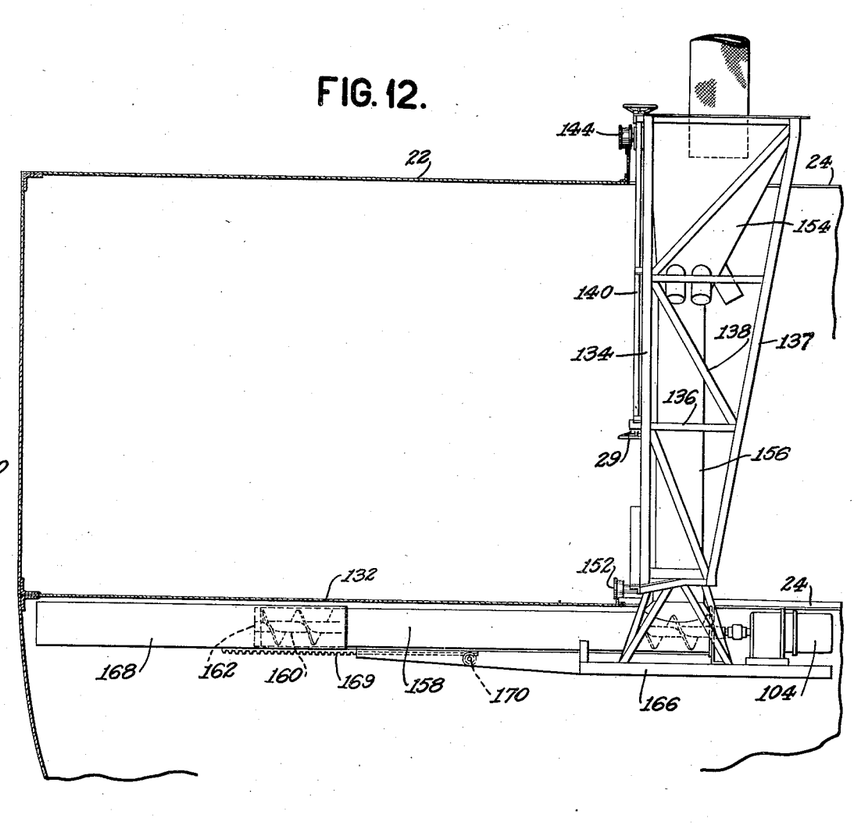
Figure 12 is a view similar to Figure 1 but showing a modified loading and trimming device.
Figure 13:
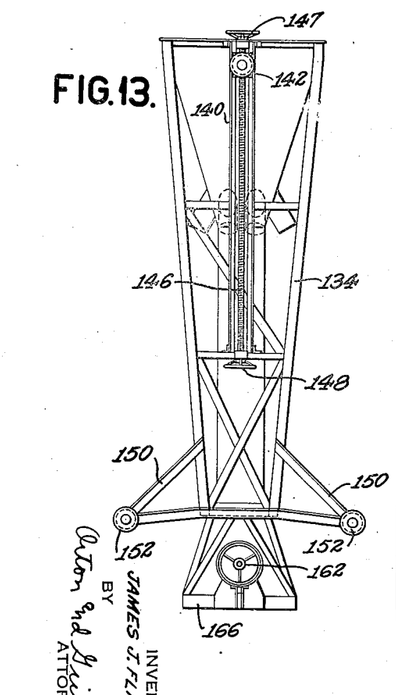
Figure 13 is a view in side elevation of the device of Figure 12.
Figure 14:
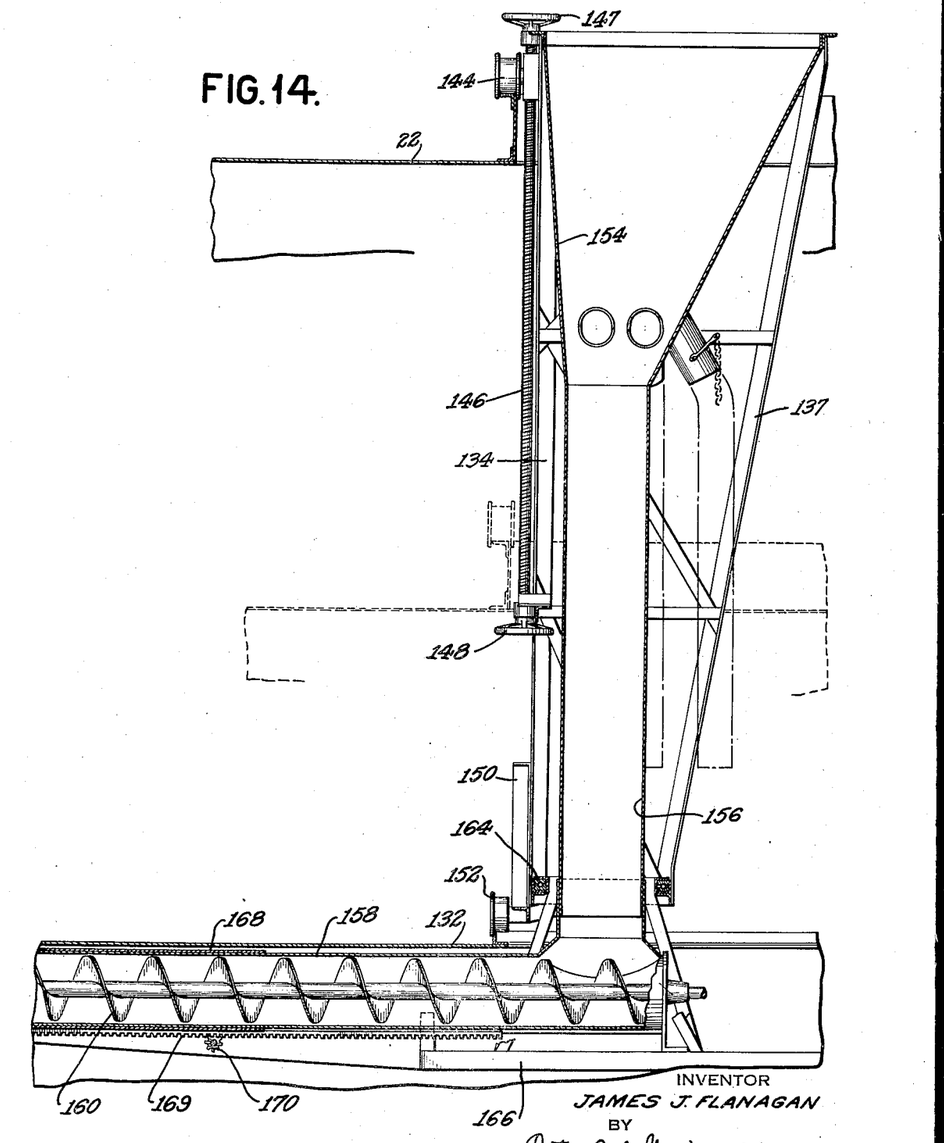
Figure 14 is a view in vertical section showing the device of Figures 12 and 13.

A modification of the invention is illustrated in Figures 12, 13 and 14 which show the invention applied to a ship having one or more intermediate decks 132 and registering hatches 24.

A rectangular frame conveniently of structural steel is comprised of diverging corner frame members 134 and if desired, upwardly diverging members 137 joined by horizontal frame members 136 and reenforced by diagonal braces 138. On the side frame members 134 is mounted a vertical guideway 140 for a block or bearing 142 carrying a flanged wheel 144 adapted to run on an upper hatch coaming the block being moved up and down by a worm 146 passing therethrough and having a hand wheel 147 at its upper end and a hand wheel 148 at its lower end whereby the block 142 may be adjusted upwardly or downwardly depending upon the greater or lesser amount of head room in the hold as will be understood. The lowermost portion 150 of the frame carries a pair of flanged wheels 152 adapted to run upon the hatch coaming of the hatch immediately beneath the upper hatch.

A hopper 154 is mounted in the frame 134, 137 at the upper portion thereof and a vertical tube 156 leads from the hopper. The lower part of the tube 156 empties into a horizontal conveyor tube 158 having, if desired, a motor driven screw conveyor 160 therein, the shaft of which terminates and turns in the forward bearing 162. As in the previously described modification a thrust bearing 164 is mounted at the end of the tube proximate motor 104. The motor and tube are carried on an underslung carriage 166 suspended from the hopper frame.

Telescoping over the end of the conveyor tube is a retractable tube 168 to which is secured a rack 169, the rack 169 being actuated by a pinion 170 driven in any desired manner so that the tube end may be protracted or retracted at will to deliver material to any desired part of the hold.

Although many have attempted to devise cargo loading devices for cargo ships and others have proposed trimming devices for cargo in bulk delivered through the hatch into the hold, such prior attempts have never been successful. This has been due primarily to a lack of universality in the proposed device due, doubtless, to lack of vision on the part of those who devised the instrumentalities.

In every instance, in the prior art, the loading devices have fallen far short of completing the loading and have made it necessary to send gangs of men into the hold to shovel the cargo into the corners of the hold and fill in the interstices between the cone-shaped mounds of material. During a loading operation, whether of coal or grain or of any other bulk cargo, the hold is filled with dust. Men working under these conditions are compelled to breath this dust, their health is affected and their lives shortened.

The present invention, being capable of delivering bulk material to every corner of a hold and delivering it evenly so that it completely fills the hold and trims the ship, solves a long felt need and avoids the necessity of working stevedores in unhealthful surroundings.

Various modifications will occur to those skilled in the art in the configuration and disposition of the component elements going to make up the invention as a whole as well as in the selection of and combination of particular elements to meet special circumstances or the substitution of other elements for those shown and described and no limitation is intended by the phraseology of the foregoing description or illustrations in the accompanying drawings except as indicated in the appended claims.

What is claimed is:

1. In a combined cargo loader and trimmer, in combination, a main carriage, comprising a frame defined by spaced longitudinal rails, flanged wheels carried at opposite ends of the frame, respectively, to run on opposed hatch coamings, a transverse carriage comprising a rectangular frame, flanged wheels carried on opposite sides of the last named frame and adapted to run on the rails of the main carriage, means carried with the main frame and adapted to overlie the last named wheels at every position thereof to prevent lifting of the transverse carriage should the same be overbalanced, means to lock the wheels of said transverse carriage against movement along the rails of the main carriage, a horizontal tubular member rigidly mounted from said rectangular frame for pivotal movement in a substantially horizontal plane, a generally vertical tubular member communicating with said horizontal tubular member to supply bulk material thereto and means for positively propelling bulk material through said horizontal tubular member.

2. In a combined cargo loader and trimmer, in combination, a travelling main carriage, a transverse carriage comprising a frame, flanged wheels carried on opposite sides of the last named frame and adapted to run on the rails of the main carriage, means for limiting the travel of said carriage, a thrust frame carried with the transverse carriage, a vertically disposed tubular member carried thereby, a thrust bearing between the tubular member and the thrust frame, a hopper carried by the transverse carriage and adapted to deliver material to the tubular member, a horizontal tube rigidly carried by the tubular member and positively propelling conveying means within the horizontal tube.

3. In a combined cargo loader and trimmer, in combination, a main travelling carriage comprising a frame, defined by spaced longitudinal rails, flanged wheels carried at opposite ends of the frame, respectively, to run on opposed hatch coamings, a transverse carriage comprising a rectangular frame, flanged wheels carried on opposite sides of the last named frame and adapted to run on the rails of the main carriage, means for limiting movement of said carriage, a thrust frame carried with the transverse carriage, a vertically disposed tubular member carried thereby, a thrust bearing between the tubular member and the thrust frame, a hopper carried by the transverse carriage and adapted to deliver material to the tubular member, a horizontal tube rigidly carried by the tubular member and conveying means within the horizontal tube.

4. In a combined cargo loader and trimmer, in combination, a main carriage comprising a frame defined by spaced longitudinal rails, flanged wheels carried at opposite ends of the frame, respectively, to run on opposed hatch coamings, a transverse carriage comprising a rectangular frame, flanged wheels carried on opposite sides of the last named frame and adapted to run on the rails of the main carriage, means to fix the transverse carriage, a thrust frame carried with the transverse carriage, a vertically disposed tubular member carried thereby, a thrust bearing between the tubular member and the thrust frame rotatably supporting the tubular member, a hopper carried by the transverse carriage and adapted to deliver material to the vertical tubular member, a horizontal tubular member in rigid and communicating relation with the vertical tubular member and a positively propelling conveyor in said horizontal tubular member.

5. In a combined cargo loader and trimmer, in combination, a main carriage, comprising a frame defined by spaced longitudinal rails, flanged wheels carried at opposite ends of the frame, respectively, to run on opposite hatch coamings, a transverse carriage comprising a rectangular frame, flanged wheels carried on opposite sides of the last named frame and adapted to run on the rails of the main carriage, means to fix said transverse carriage, a thrust frame carried with the transverse carriage, a vertically disposed tubular member carried thereby, a thrust bearing between the tubular member and the thrust frame, a worm gear carried by the tubular member, a worm whereby said vertical member is rotated, a horizontal tubular member in rigid and communicating relation with the vertical tubular member and a positively propelling conveyor in said horizontal tubular member.

6. In a combined cargo loader and trimmer, in combination, a carriage adapted to travel over a hatch-way, means to fix said carriage, a frame carried by the carriage, a vertical tubular member, a thrust bearing carried by the frame and rotatably supporting the tubular member, a horizontal tube in rigid communicating relation with the vertical tube and a screw conveyor within the last named tube.

7. In a combined cargo loader and trimmer, in combination, a carriage adapted to travel over a hatch-way, means to fix said carriage, a frame carried by the carriage, a vertical tubular member, a thrust bearing carried by the frame and rotatably supporting the tubular member, a horizontal tube in rigid communicating relation with the vertical tube, a screw conveyor within the last named tube and a tube telescoping over the end of the horizontal tube.

8. In a combined cargo loader and trimmer, in combination, a main carriage, comprising a frame, defined by spaced longitudinal rails, flanged wheels carried at opposite ends of the frame, respectively, to run on opposite hatch coamings, a transverse carriage comprising a frame comprising opposed channels, means to fix said carriage, a frame disposed within and extending between the channels, a vertically disposed tubular member, spaced bearings rotatably mounted on the frame and rotatably supporting the tubular member, a worm wheel carried by said tubular member, a worm journalled in the frame and in wesh with the worm wheel, means to rotate the worm, dust-proof means sealing the bearings, a hopper frame carried by the transverse carriage, a hopper carried thereby, means carried by the first named frame to centralize the neck of the hopper, a horizontal tube rigidly secured to the lower end of the tubular member and communicating therewith, a platform carried beneath the last named tube, a screw conveyor within the tube and motor means carried by the platform and driving the conveyor.

9. In a combined cargo loader and trimmer, in combination, a main carriage, a transverse carriage, means to fix said transverse carriage, a vertically disposed rotatable tubular member, a hopper frame carried by the transverse carriage, a hopper carried thereby, a horizontal tube rigidly secured to the lower end of the tubular member and communicating therewith, a platform carried beneath the last named tube, a screw conveyor within the tube and motor means carried by the platform and driving the conveyor.

10. In a combined cargo loader and trimmer, in combination, a frame, at least one flanged wheel near the upper portion of the frame adapted to run on a hatch coaming, at least one flanged wheel near the lower portion of the frame adapted to run on a hatch coaming of a 'tween deck, a vertical tube carried by the frame, a hopper in communicating relation with the tube, a horizontal tube in rigid and communicating relation with the vertical tube and rotatably supported thereby, a positively propelling conveyor in the horizontal tube and a tube telescoping over the horizontal tube.

11. In a combined cargo loader and trimmer, in combination, a frame, at least one flanged wheel near the upper portion of the frame adapted to run on a hatch coaming, spaced flanged wheels near the lower portion of the frame adapted to run on a hatch coaming of a 'tween deck, a vertical tube carried by the frame, a hopper in communicating relation with the tube, a horizontal tube in rigid and communicating relation with the vertical tube and rotatably supported thereby, and a positively propelling conveyor in the horizontal tube.

12. In a cargo loading and trimming device, in combination, a frame for mounting with reference to a hatch, a vertical tubular member, a thrust bearing carried by the frame and rotatably supporting the tubular member, a horizontal tube in rigid and communicating relation with the vertical tube about which it may pivot and a screw conveyor within the last named tube.

13. In a combined cargo loader and trimmer, in combination, a frame, means to position said frame over a hatch-way, a horizontal tubular member rigidly supported from said frame for pivotal movement in a substantially horizontal plane, a generally vertical tubular member communicating with said horizontal tubular member to supply bulk material thereto and means for positively propelling bulk material through said horizontal tubular member.

14. In a combined cargo loader and trimmer, in combination, a main carriage defined by spaced longitudinal rails, flanged wheels carried at opposite ends thereof, respectively, to run on opposed hatch coamings, a transverse carriage comprising a frame, means to limit movement of said transverse carriage, a horizontal tubular member rigidly mounted from said frame for pivotal movement in a substantially horizontal plane, a generally vertical tubular member communicating with said horizontal tubular member to supply bulk material thereto, means for positively propelling bulk material through said horizontal tubular member and a hopper carried by the transverse carriage to supply bulk material to the vertical tubular member.

JAMES J. FLANAGAN.

CERTIFICATE OF CORRECTION.

Patent No. 2,216,704. October 1, 1940.

JAMES J. FLANAGAN.

It is hereby certified that error appears in the printed specification of the above numbered patent requiring correction as follows: Page 4, first column, line 75, claim 5, after the word "vertical" insert --tubular--; and second column, line 37, claim 8, for "wesh" read --mesh--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.